United States Patent [19]

Levenstein

[11] Patent Number: 5,224,762
[45] Date of Patent: Jul. 6, 1993

[54] SLIDING SEAL FOR MINING MACHINE POWER TRANMISSION

[75] Inventor: Victor M. Levenstein, Reynoldsburg, Ohio

[73] Assignee: Indresco Inc., Dallas, Tex.

[21] Appl. No.: 848,511

[22] Filed: Mar. 9, 1992

[51] Int. Cl.$^5$ .......................... E21C 31/12; F16J 15/02
[52] U.S. Cl. ......................................... 299/42; 277/9; 277/178; 277/189; 403/349
[58] Field of Search ....................... 299/42, 29, 89, 95; 277/9, 11, 178, 189, 181; 403/335, 337, 338, 349; 285/408, 414

[56] References Cited

U.S. PATENT DOCUMENTS

| | | | |
|---|---|---|---|
| 3,397,894 | 8/1968 | Mastriforte et al. | 277/30 |
| 3,415,285 | 12/1968 | Torp | 138/94.3 |
| 3,666,276 | 5/1972 | Hubler | 285/302 |
| 3,675,933 | 7/1972 | Nappe | 277/9 |
| 3,866,924 | 2/1975 | French | 277/59 |
| 4,443,015 | 4/1984 | Duffee et al. | 277/30 |
| 4,981,311 | 1/1991 | Kinney | 277/30 |

Primary Examiner—David J. Bagnell

[57] ABSTRACT

A power train for driving a functional mechanism of a mining machine includes a sealing mechanism extendable across the space between drive and driven units in the power train and surrounding a drive shaft extending between the two units. The sealing mechanism includes a tubular seal carrier with one end portion which is sealable against an annular seal face on one of the units and an opposite end portion which is sealable against a sealing ring surface on the other of the units for sealed protection of a drive shaft connected between the units. A clamp is connectable between the one end of the carrier and the one unit to pull the carrier into sealing engagement with such unit while maintaining sealing contact with the other unit. When the clamp is released, the carrier is free to be moved into a retracted position freeing the space between the units to be used in removing either of the units from the power train.

8 Claims, 3 Drawing Sheets

SLIDING SEAL FOR MINING MACHINE POWER TRANMISSION

BACKGROUND OF THE INVENTION

1. Technical Field

This invention relates to a sealing arrangement such as may be used to seal around a shaft extending between units in a power train for delivering power to a functional mechanism of a mining machine.

2. Background Information

In a power train for driving a functional mechanism such as the cutting head, conveyor, loading mechanism, tram or other operation performing part of a mining machine, it is important that the drive connection between adjacent units in the train be adequately sealed to prevent contamination of the lubricant used in protecting the various wear surfaces within the units. The conditions under which mining machines inherently operate are particularly harsh in creating particles that may infiltrate and contaminate the lubricant normally protecting machine parts against wear.

Also, in the design of such power trains, space and strength considerations dictate that the various units in the power train be arranged compactly with a limited amount of space between adjacent units. This dictates the use of special design features or service procedures for servicing the units or in providing routine maintenance or replacement of the various units in the power train. In one prior power train arrangement for example, a split rubber seal is utilized between an electric drive motor and a gearbox to cover a drive shaft connected between the motor and the gears in the gearbox. The seal comprises two half torics sections split in an axial direction and sealingly clamped together between inside and outside half cylindrical metal liners. When unclamped, the liners and seal halves may be removed from between the motor and gearbox for servicing either the motor or the gearbox from the space therebetween or for utilization of the space in removing either of such units.

Another prior arrangement utilizes a solid annular rubber seal clamped between the motor and the gearbox within a pilot bore supporting the motor on the frame of the mining machine. With this arrangement, disassembly of the motor is required for access to the seal or the gearbox.

Disclosed in U.S. Pat. No. 3,415,285 is a more complex form of sealing arrangement used in an environment different than that within which the present invention is used. U.S. Pat. No. 3,415,285 teaches the use of a packing gland between two relatively fixed tube end members which are part of a conduit such as may be used for transporting liquid. The gland is fitted into the end of one of the tube members and is retractable in such member to allow a blind flange to be inserted between the tube ends to close off flow through the conduit without having to move the tube ends. Impervious sealing is provided between the gland and the tube end by a rubber collar having one flanged end clamped sealingly to the gland and an opposite flanged end clamped sealingly within the tube end. A travel screw arrangement acting between the gland and the one tube member is used to move the gland axially within the tube for changing out the blind flange. Additionally, bolts are connected between the two fixed tube end members to insure axial alignment of the two members.

SUMMARY OF THE INVENTION

The general aim of the present invention is to improve the repair and maintenance serviceability of adjacent units in a mining machine power train, leading for example to a cutting head, through the provision of a simple and inexpensive sealing mechanism which enables either of the units or the sealing mechanism itself to be removed without having to disassemble any unit that does not require servicing.

More specifically, it is an object of the present invention to achieve the foregoing through the provision of a sealing mechanism including parts which may be retracted out-of-the-way into one of the units in the power train but which may be extended to seal between the units without the dimension of the space between the units being critical to the effectiveness of the seal. In this connection, the invention resides in the provision of a unique tubular seal carrier which at one end is adapted to be releasably and sealingly secured to a seal face for one of the units and which at the other end is adapted for sealing against an axially extending sealing ring surface in the other of the units.

Invention also resides in the provision of a novel clamp for securing the seal carrier to the one unit and in the connection of the clamp to the carrier in a manner allowing the clamp to be easily disconnected from the carrier to free more of the space between the units for use when removing either of the units from the power train.

The foregoing and other novel aspects and advantages of the present invention will become more apparent from the following description of the preferred embodiment when taken in conjunction with the accompanying drawings.

Figure 2:
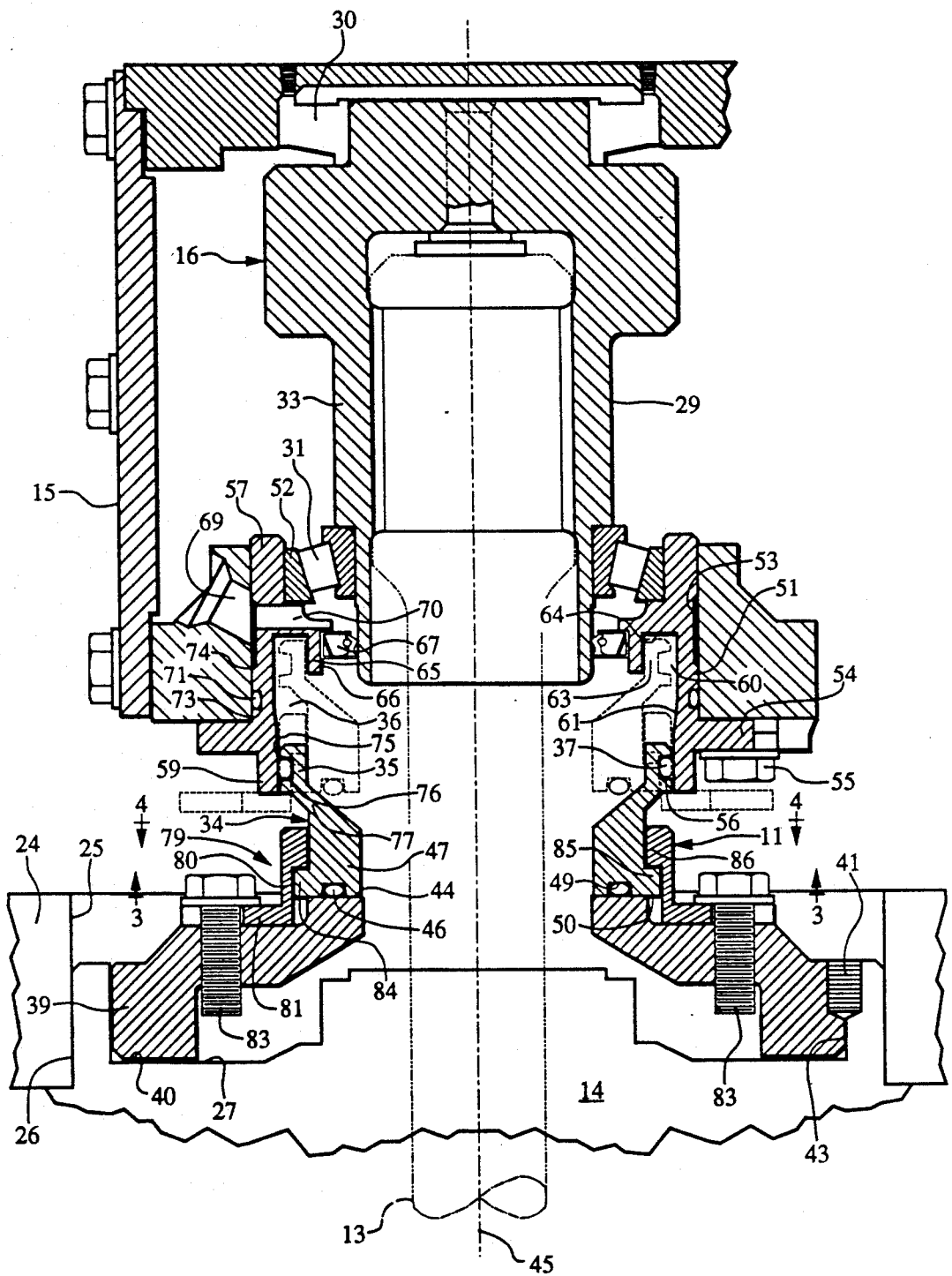
FIG. 2 is a an enlarged cross-sectional view of the sealing mechanism shown in FIG. 1.

FIG. is a view taken along line 3—3 of FIG. 2 but parts removed for clarity of illustration.

Figure 4:
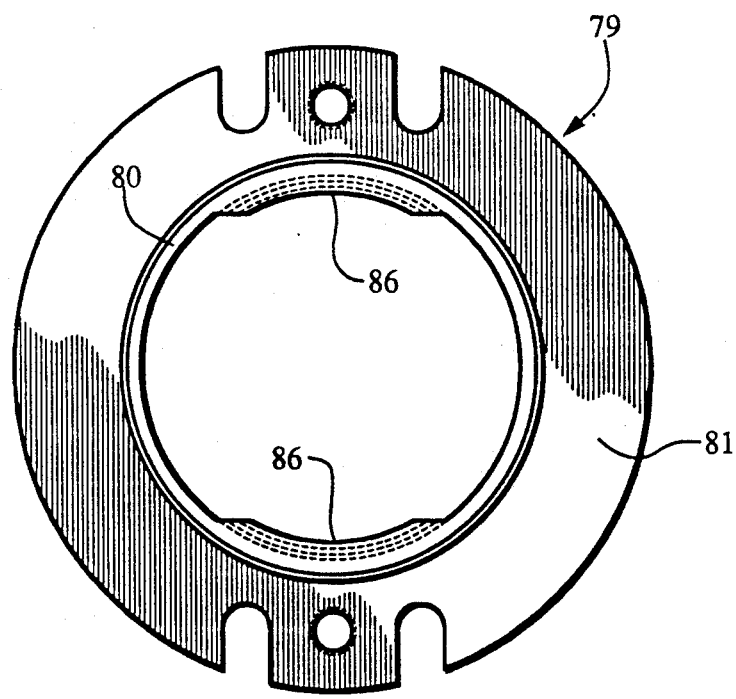

FIG. 4 is a view taken along line 4—4 of FIG. 2 but with parts removed for clarity of illustration.

BEST MODE FOR CARRYING OUT THE INVENTION

Figure 1:
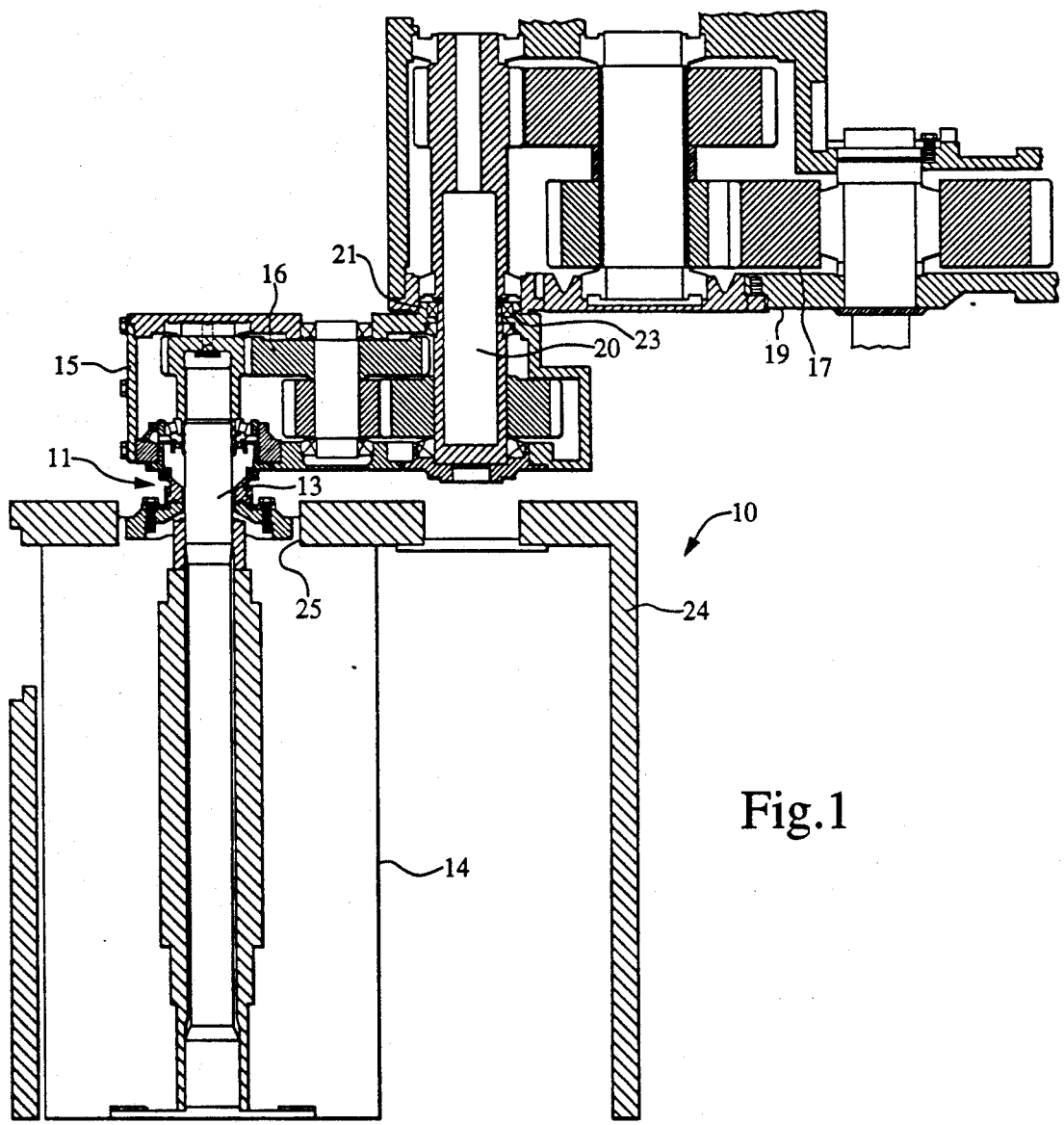
FIG. 1 is a fragmentary cross-sectional view of a portion a mining machine cutting head power train having between two units thereof a sealing mechanism embodying the novel features of the present invention.

As shown in the drawings for purposes of illustration, the present invention is embodied in a power train 10 for driving a functional mechanism such as a cutting head (not shown) of a mining machine and is specifically concerned with a sealing mechanism 11 such as may be used between drive and driven units in the power train for sealing around a drive shaft 13 extending between the two units. With reference more particularly to FIG. 1, the sealing mechanism 11 is mounted between an electric motor 14 and an input gearbox or case 15 containing an input gear set 16. The latter in turn is drivingly connected to a cutting head gear set 17 which is housed in a gear case 19 supported on a portion of mining machine frame. At the output end of the input gear set, an output shaft 20 connects with the cutting head gear set 17.

For supporting the input gear case 15 on the mining machine, an annular boss 21 is formed on the outside of the case 15 around the output shaft 20. The boss is telescoped into a pilot hole 23 in the cutting head gear case 19 with the input gear case secured by means of bolts (not shown) to anchor the input gear case to the cutting head gear case and the pilot hole 23 and boss 21 serving to locate the two gear sets relative to each other.

In a similar manner, the motor 14 is located on a frame portion 24 of the mining machine within a motor pilot bore 25 (see also FIG. 2). Specifically, an annular shoulder 26 integrally formed within a motor housing 27 is telescoped into the motor pilot bore. In connecting the motor to the input gear set 16, the drive shaft 13 extends through the motor pilot opening 25, across a space between the motor and the input gear set to connect with a pinion gear 29. The latter is supported within the case 15 on bearings 30 and 31 located at opposite ends of a support shaft 33 integrally formed with the pinion gear.

For servicing or replacement of either of the input gear set 16 or the motor 14, it may be necessary to remove the sealing mechanism 11 from the space between the motor and the gear case 15 in order to gain access to the power train unit which is to be serviced. This is particularly true when disconnecting the input gear case 15 from the cutting head gear case 19 (shown in FIG. 1) such as when replacing the input gears for changing the speed of the cutting head because the input gear case must be moved toward the motor 14 in order to pull the boss 21 from the pilot hole 23 in the cutting head gear case.

In accordance with the present invention, the sealing mechanism 11 includes a unique tubular carrier 34 which is retractable from sealing between the motor 14 and the gearbox 15 into an out-of-the-way position allowing removal of either the motor or gearbox without having to disassemble the other. For this purpose, one end portion 35 of the carrier is telescoped into a cylindrical sealing chamber 36 in the gearbox and includes an annular sealing element 37 in the form of an o-ring. In an extended position for the carrier, the o-ring functions to seal between the seal carrier and the sealing chamber regardless of the precise axial position of the carrier relative to gearbox. In its retracted position, the carrier frees the space between the motor and gearbox allowing either to be removed easily from the power train.

In the present instance, for sealing of the carrier 34 to the motor 14 and annular adapter 39 (see FIG. 2) is mounted on the front of the motor within a recess 40 formed in the motor housing 26 around the drive shaft 13. The adapter is held in the recess by a set screw 41 acting between the outside of the adapter and an inside wall 43 of the recess. On the outside of the adapter and facing in an axial direction toward the input gear case 15 is a radially extending annular seal face 44 disposed concentrically with a rotational axis 45 of the drive shaft 13. When the tubular carrier is in its extended position, the solid line position shown in the FIG. 2, a sealing member 46 in the form of an o-ring is squeezed between the seal face 44 and an outer end portion 47 of the carrier for sealing purposes. Specifically, the o-ring 46 is mounted within a longitudinally opening annular groove 49 which is formed within a radially extending face 50 on the outer end 47 of the carrier.

For sealing the other end portion 35 of the carrier 34 to the input gear case 15, the cylindrical sealing chamber 36 is located in the input gear case and surrounds the drive shaft 13. Herein, the sealing chamber 36 is formed in the axially outward end portion of a generally tubular housing 51 which carries an outer bearing race 52 for the pinion gear support shaft 33. The sealing chamber housing 51 is telescoped within a pilot bore 53 in the input gear case 15 and includes a flange 54 which is located between inner and outer ends 57 and 59 of the housing and protrudes radially outward from the outside thereof to overlap the edge of the pilot bore 53. Bolts 55 serve as the means by way of which the housing is secured to the input gear case.

The sealing chamber 36 is defined within the housing 51 and includes an inside sealing ring surface 56 formed in the outer end portion 59 of the housing axially outward of the flange 54. Spaced axially inward from the sealing ring surface is an annular receiver wall portion 60 with a transition wall 61 extending between the sealing ring surface and the receiver wall portion. Specifically, the transition wall tapers radially outwardly upon progressing axially inward from the sealing surface to the receiver wall portion. Thus, the latter is both spaced axially inward and radially outward of the sealing surface and forms the radially outward wall of an annular receiver cup 63. In its retracted position, the inward end portion 35 of the carrier 34 is telescoped into the cup by axial movement into the dashed line position shown in FIG. 2. A radially outwardly extending end wall 64 defines the inner end of the cup. Spaced radially inward of the receiver wall is an axially outwardly extending inner lip 65 having an inside wall 66 extending parallel to an outermost end portion of the pinion gear support shaft 33. Acting between the shaft 33 and the inside wall 66 is an annular sealing element 67 which keeps lubricant from leaking between the shaft and the sealing chamber housing 51.

Within the input gear case 15, lubricant is supplied to the outside of the bearing 31 through generally radial passages 69 and 70 formed in the gear case 15 and housing 51, respectively. For sealing the outside of the housing with the input gear case is an exterior seal member 71 which is spaced axially inward from the flange 54. The seal member is seated within an annular groove 73 formed in the outside surface 74 of the housing and serves to seal against the loss of lubricant from the inside of the input gear case between housing 51 and the pilot bore 53.

For sealing of the carrier 34 in its extended position within the sealing chamber 36, the inward end portion 35 of the carrier includes an outside cylindrical sealing surface 75. The latter is of a diameter sized to slidably telescope into the cylindrical chamber 36. A radially outward opening annular groove 76 is formed in the cylindrical sealing surface and the o-ring 37 is mounted within the groove to seal against the inside sealing ring surface 56 of the sealing chamber 36. In the extended position, the relative diameters of the bottom surface of the groove 76 and the sealing surface 56 are such as to effectively place a sealing squeeze on the o-ring 37. The diameter of the transition wall 61 and receiver wall 60, however, are larger, allowing the squeeze of the o-ring to be relaxed as the carrier is moved into its retracted position.

Figure 3:
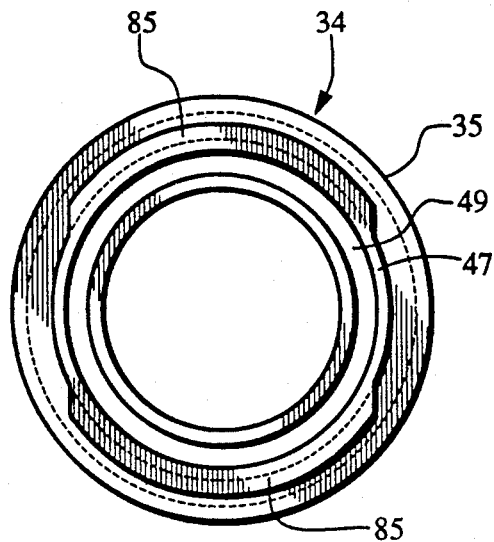

As shown in FIGS. 2 and 3, the outer end portion 47 of the carrier 34 is smaller in diameter than the inward end portion 35. Integrally connected with and extending between the inward and outer end portions is a generally frustoconical midsection 77. The length of the carrier in an axial direction is equal to the longitudinal depth of the sealing chamber 36 so that in its retracted position, the radially extending face 50 of the carrier is radially aligned with the outer end 59 of the seal housing 51 as is shown in the dashed line position in FIG. 2.

In its extended position, carrier 34 is secured sealingly against the motor housing adapter 39 by means of a clamp 79 which is releasably connectable between the carrier and the adapter. Herein, the clamp is a flanged sleeve member including a tubular section 80 integrally formed with a radially outwardly extending flange 81 at one end. Bolts 83 are used to connect the flanged end of the sleeve member 80 to the adapter with a bayonet connection 84 between the sleeve and the carrier serving to pull the carrier, and in turn squeeze the o-ring 46 between the seal face 44 and the radially extending face 50 when the bolts are tightened in the adapter.

The bayonet connection 84 is formed of two angularly spaced flanged sections 85 (also see FIGS. 3 and 4) formed on the carrier and two complimentary angularly spaced lips 86 formed on the outer end of the tubular section 80 of the sleeve. The flanges 85 are formed on the outer end 47 of the carrier, each extending axially outwardly thereof for a predetermined distance and angularly for a specified arcuate length so that the flanges are centered generally diametrically of each other on the carrier. The inside diameter of the sleeve 80 is only slightly greater than the outer diameter of the flanges 85 leaving an annular gap between the inside of the sleeve and the outer surface of the outer end portion of the carrier when assembled together. The two lips 86 formed on the outer end of the sleeve are spaced angularly from each other by an arcuate distance slightly greater than the arcuate length of the flanges 85 on the carrier and extend radially inward so that an interference exists between the flanges and the lips when the two are aligned axially with each other. Accordingly, when the bolts 83 are tightened in the motor adapter, the bayonet connection 84 causes the carrier to be pulled against the adapter. When the bolts are removed, the carrier 34 may be slid axially into its retracted position. If desired, the sleeve member 80 may be rotated to misalign the lips and flanges from each other allowing the clamp to be removed axially from the carrier. With the carrier moved into its retracted position, the input gear case 15 can be unbolted from the cutting head gear case 19 and pulled axially from the pilot hole 23 utilizing the space between the motor and the input gearbox to allow for such movement.

I claim:

1. In a mining machine with a power train for driving a functional mechanism, said power train having a drive unit, a driven unit spaced from said drive unit, an annular seal face on one of said units, a sealing ring surface on the other of said units, and a tubular sealing mechanism extending across the space between said units for sealed protection of a drive shaft connected between said drive and driven units, wherein the improvement comprises, said sealing mechanism including a tubular seal carrier with a first end portion having a cylindrical sealing surface telescoped with said sealing ring surface, an annular seal element mounted in sealing engagement between said sealing ring surface and said cylindrical sealing surface, said carrier further having a second end portion with a radially extending face, a clamp connected between said one unit and said carrier and urging said radially extending face toward said annular seal face, and a sealing member disposed in sealing engagement between said annular seal face and said radially extending face.

2. In a mining machine as defined in claim 1 wherein the improvement further comprises said clamp including a sleeve having a base at one end thereof adapted for connection to said one unit, said sleeve having an opposite end portion thereof telescoped onto said carrier, and a connection between said opposite end portion and said carrier for securing said sleeve and said carrier together.

3. In a mining machine as defined by claim 2 wherein said connection between said carrier and said sleeve is a bayonet connection.

4. A generally tubular sealing mechanism for use in the power train of a mining machine to seal between an annular seal face on one of two spaced apart units in the power train and a sealing ring surface on the other of said units for sealed protection of a drive shaft connected between said two units, said sealing mechanism including a tubular seal carrier with a first end portion having a cylindrical sealing surface for being telescoped with said sealing ring surface, an annular seal element mountable on said cylindrical sealing surface for sealing engagement between said sealing ring surface and said cylindrical sealing surface, said carrier further having a second end portion with a radially extending face, a clamp connectable between said one unit and said carrier for urging said radially extending face toward said annular seal face, and a sealing member mountable in sealing engagement between said annular seal face and said radially extending face.

5. In a power train for driving a functional mechanism of a mining machine, the combination of a support frame containing a pilot bore, a drive unit with an annular shoulder inserted into said bore to locate said drive unit on said frame, a driven unit for transmitting power from said drive unit to the functional mechanism, a support connected to said frame and including a pilot opening therein, a boss on said driven unit inserted into said pilot opening for locating said driven unit a predetermined distance spaced from said drive unit, a shaft drivingly connected across said space between said drive and driven units, an annular seal face on one of said units, a sealing ring surface on the other of said units, and a tubular sealing mechanism surrounding said shaft, connected across said space between said drive and driven units and sealing between said annular seal face and said sealing ring surface for sealed protection of said drive shaft, said sealing mechanism including a tubular seal carrier with a first end portion having a cylindrical sealing surface telescoped with said sealing ring surface, an annular seal element mounted in slidable sealing engagement between said sealing ring surface and said cylindrical sealing surfaces, said carrier further having a second end portion with a radially extending face, a clamp connected between said one unit and said carrier and urging said radially extending face toward said annular seal face, and a sealing member disposed in sealing engagement between said annular seal face and said radially extending face.

6. In a power train for driving a functional mechanism of a mining machine, the combination of
   a support frame containing a pilot bore;
   a drive unit with an annular shoulder inserted into said bore to locate said drive unit on said frame;
   a driven unit for transmitting power from said drive unit to the functional mechanism;
   a support connected to said frame and including a pilot opening therein;

boss on said driven unit inserted into said pilot opening for locating said driven unit a predetermined distance spaced from said drive unit;

a shaft drivingly connected between said drive and driven units across said space;

an annular seal face on one of said units and surrounding said shaft;

a cylindrical sealing chamber in the other of said units and surrounding said shaft;

said chamber including an inside sealing ring surface, an annular receiver wall portion spaced axially inward and radially from said sealing ring surface and a transition wall extending between said sealing ring surface and said annular receiver wall portion; and a tubular sealing mechanism surrounding said shaft, connected across said space between said drive and driven units and sealing between said annular seal face and said sealing ring surface for sealed protection of said drive shaft;

said sealing mechanism including; a tubular seal carrier with a first end portion having a cylindrical sealing surface slidably telescoped with said cylindrical chamber in sealing relationship to said sealing ring surface; an annular seal element mounted in sealing engagement between said sealing ring surface and said cylindrical sealing surface; said carrier further having a second end portion with a radially extending face, said carrier being movable between retracted and extended positions between said units, in said retracted position said carrier having said cylindrical sealing surface telescoped into said sealing chamber and out of sealing engagement with said sealing ring surface and said radially extending face being spaced from said annular seal face, and in said extended position said radially extending face being in sealing relationship with said annular seal face; a sealing member disposed for sealing engagement between said annular seal face and said radially extending face; and a clamp releasably connectable between said carrier and said one unit for securing said carrier in its extended position when connected therebetween and, when released, permitting said carrier to be moved into its retracted position for said other of said units to be removed from said power train without having to disassemble said one unit.

7. In a power train as defined in claim 6 including a connection between said carrier and said clamp enabling said clamp to be removed from said carrier.

8. A generally tubular sealing mechanism for use in the power train of a mining machine to seal between an annular seal face on one two spaced apart units in the power train and a sealing ring surface in a cylindrical sealing chamber in the other of said units, said sealing mechanism including;

a tubular seal carrier having a first end portion with a cylindrical sealing surface to be telescoped with said cylindrical chamber in sealing relationship to said sealing ring surface;

an annular seal element mountable in sealing engagement between said sealing ring surface and said cylindrical sealing surface;

said tubular carrier further having a second end portion with a radially extending face and said carrier being movable relative to said cylindrical chamber between retracted and extended positions, in said retracted position, said carrier having said cylindrical sealing surface telescoped with said sealing chamber out of sealing engagement with said sealing ring surface, and in said extended position, said radially extending face being positioned for sealing with said annular seal face;

a sealing member associated with said radially extending face for sealing engagement with said annular seal face; and a clamp releasably connectable between said carrier and said one unit for securing said carrier in its extended position when connected therebetween and, released, permitting said carrier to be moved into its retracted position.

* * * * *